(12) United States Patent
Sakagami

(10) Patent No.: US 8,977,447 B2
(45) Date of Patent: Mar. 10, 2015

(54) TORQUE RATIO ESTIMATING APPARATUS FOR CONTINUOUSLY VARIABLE TRANSMISSION AND LATERAL PRESSURE CONTROL APPARATUS FOR CONTINUOUSLY VARIABLE TRANSMISSION

(75) Inventor: Kyohei Sakagami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 13/576,367

(22) PCT Filed: Nov. 18, 2010

(86) PCT No.: PCT/JP2010/070570
§ 371 (c)(1),
(2), (4) Date: Jul. 31, 2012

(87) PCT Pub. No.: WO2011/104954
PCT Pub. Date: Sep. 1, 2011

(65) Prior Publication Data
US 2012/0316016 A1    Dec. 13, 2012

(30) Foreign Application Priority Data
Feb. 26, 2010  (JP) ................... 2010-042956

(51) Int. Cl.
*G06F 7/00*     (2006.01)
*F16H 61/662*   (2006.01)
(Continued)

(52) U.S. Cl.
CPC .......... *F16H 61/66272* (2013.01); *F16H 59/14* (2013.01); *F16H 2059/465* (2013.01)
USPC ................. 701/51; 701/60; 477/45

(58) Field of Classification Search
CPC .............. F16H 59/14; F16H 61/66272; F16H 2059/465
See application file for complete search history.

(56) References Cited

U.S. PATENT DOCUMENTS

| 4,673,378 A | 6/1987 | Tokoro et al. |
| 6,007,452 A | 12/1999 | Sawada et al. |

(Continued)

FOREIGN PATENT DOCUMENTS

| CN | 1154453 A | 7/1997 |
| CN | 1683810 A | 10/2005 |

(Continued)

OTHER PUBLICATIONS

Supplementary European Search Report, EP Application No. 10 84 6617 dated Jul. 29, 2013.

(Continued)

*Primary Examiner* — David D Le
(74) *Attorney, Agent, or Firm* — Squire Patton Boggs (US) LLP

(57) ABSTRACT

When estimating a torque ratio, which is the ratio of an actually transmitted torque relative to the maximum transmittable torque of a continuously variable transmission, based on the transmission characteristics for transmitting a given variable component of an input shaft element to an output shaft element via a frictional element, since the torque ratio is estimated from a slip identifier, an indicator for difference in amplitude of a variable component between the two elements, or a phase lag, an indicator for difference in phase of the variable component between the two elements, it is possible to estimate the torque ratio, which is closely related to the power transmission efficiency of the continuously variable transmission, with good precision, thus improving the power transmission efficiency. Moreover, since the torque ratio is estimated from the slip identifier or the phase lag, it is possible to minimize the number of sensors necessary for estimation.

10 Claims, 15 Drawing Sheets

(51) Int. Cl.
  *F16H 59/14*   (2006.01)
  *F16H 59/46*   (2006.01)

(56) References Cited

U.S. PATENT DOCUMENTS

| | | | |
|---|---|---|---|
| 8,600,634 B2 * | 12/2013 | Van Der Sluid et al. | 701/61 |
| 2002/0165064 A1 | 11/2002 | Miki et al. | |
| 2004/0127313 A1 * | 7/2004 | Shimanaka et al. | 474/18 |
| 2004/0127331 A1 * | 7/2004 | Sawada et al. | 477/44 |

FOREIGN PATENT DOCUMENTS

| | | |
|---|---|---|
| CN | 101004208 A | 7/2007 |
| DE | 10 2005 053 457 A1 | 6/2006 |
| EP | 1 236 935 A2 | 9/2002 |
| JP | 10-9373 A | 1/1998 |
| JP | 2001-241540 A | 9/2001 |
| JP | 2006-336796 A | 12/2006 |
| JP | 2009-243683 A | 10/2009 |
| WO | WO 2009/006943 A1 | 1/2009 |

OTHER PUBLICATIONS

Chinese Office Action dated May 6, 2014 issued in Chinese Patent Application No. 201080064754.3.

* cited by examiner

FIG.12
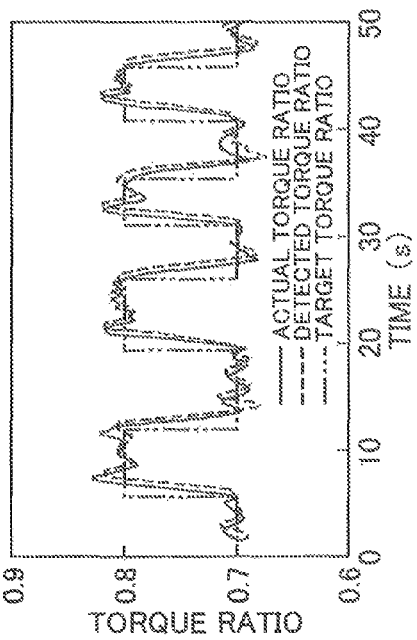
(C)
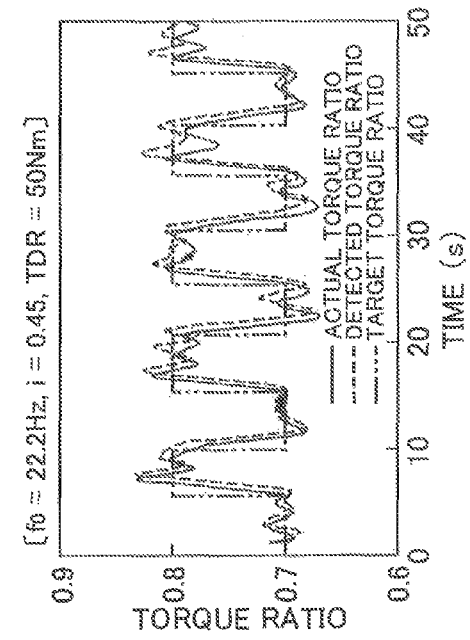
(D)
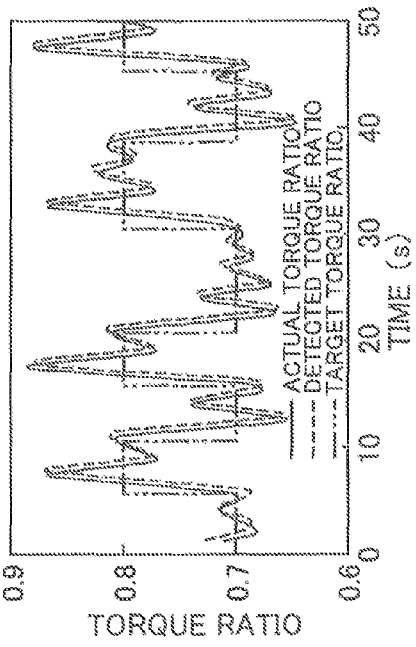
(A)
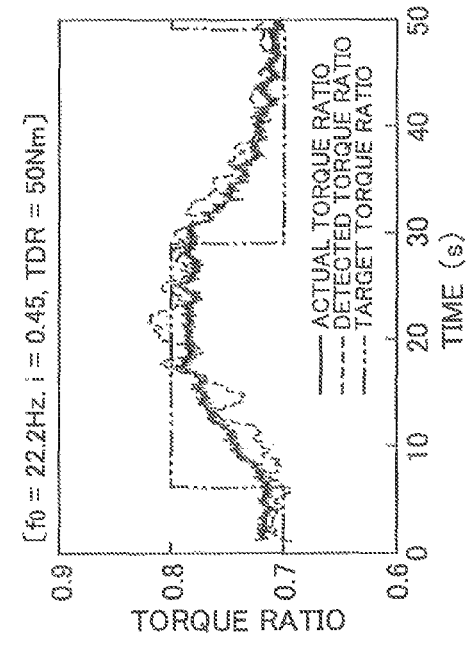
(B)

TORQUE RATIO ESTIMATING APPARATUS FOR CONTINUOUSLY VARIABLE TRANSMISSION AND LATERAL PRESSURE CONTROL APPARATUS FOR CONTINUOUSLY VARIABLE TRANSMISSION

CROSS-REFERENCED TO RELATED APPLICATION

This application is a National Stage entry of International Application PCT/JP2010/070570, filed Nov. 18, 2010, which claims priority to Japanese Patent Application No. 2010-042956, filed Feb. 26, 2010, the disclosure of the prior applications are hereby incorporated in its entirety by reference.

TECHNICAL FIELD

The present invention relates to a torque ratio estimating, apparatus for a continuously variable transmission, the apparatus including an input shaft element to which the driving force of a drive source is inputted, an output shaft element via which the driving force of the drive source is changed in speed and outputted, a transmission element that is in contact with each of the two elements and transmits the driving force from the input shaft element to the output shaft element by virtue of friction in the contacted portions, and torque ratio estimating means that estimates a torque ratio, which is the ratio of an actually transmitted torque relative to a maximum transmittable torque, based on transmission characteristics of a given variable component of the input shaft element to the output shaft element, and a lateral pressure control apparatus for a continuously variable transmission that includes the torque ratio estimating apparatus for a continuously variable transmission.

BACKGROUND ART

A belt type continuously variable transmission in which an endless belt is wound around a drive pulley provided on an input shaft and a driven pulley provided on an output shaft, and gear shifting is carried out by changing the groove width of the two pulleys by gear shift hydraulic pressure, wherein power transmission efficiency is improved by controlling pulley lateral pressure applied to the pulleys based on parameters such as a slip identifier IDslip and a phase lag Δϕ, which are introduced while taking into consideration the generation of a difference in amplitude or phase due to slippage of the endless belt between torque variation of the input shaft and torque variation of the output shaft, is known from Patent Document 1 below.

RELATED ART DOCUMENT

Patent Document

Patent Document 1: Japanese Patent Application Laid-open No. 2009-243683

SUMMARY OF THE INVENTION

Problems to be Solved by the Invention

The power transmission efficiency of a belt type continuously variable transmission is closely related to a parameter called torque ratio Tr, which is described later, and since in the above-mentioned arrangement the torque ratio Tr is indirectly controlled using a slip identifier IDslip or a phase lag Δϕ as a parameter, it is difficult to control the torque ratio Tr so as to be a desired value with good responsiveness, and it is impossible to sufficiently enhance the power transmission efficiency of the continuously variable transmission.

The present invention has been accomplished in light of the above-mentioned circumstances, and it is an object thereof to improve the power transmission efficiency of a continuously variable transmission.

Means for Solving the Problems

In order to attain the above object, according to a first aspect of the present invention, there is provided a torque ratio estimating apparatus for a continuously variable transmission, the apparatus comprising: an input shaft element to which the driving force of a drive source is inputted, an output shaft element via which the driving force of the drive source is changed in speed and outputted, a transmission element that is in contact with each of the two elements and transmits the driving force from the input shaft element to the output shaft element by virtue of friction in the contacted portions, and torque ratio estimating means that estimates a torque ratio, which is the ratio of an actually transmitted torque relative to a maximum transmittable torque, based on transmission characteristics of a given variable component of the input shaft element to the output shaft element, wherein the torque ratio estimating means estimates the torque ratio from at least one of a slip identifier, which is an indicator for difference in amplitude of the variable component between the two elements, and a phase lag, which is an indicator for difference in Phase of the variable component between the two elements.

Further, according to a second aspect of the present invention, in addition to the first aspect, the torque ratio estimating means estimates the torque ratio by selecting the slip identifier or the phase lag according to a frequency band of the variable component.

Furthermore, according to a third aspect of the present invention, in addition to the first or second aspect, the torque ratio estimating means estimates the torque ratio by correcting a change in the transmission characteristics due to change of a natural frequency of at least one of the input shaft element, the transmission element, and the output shaft element.

Moreover, according to a fourth aspect of the present invention, in addition to the third aspect, the slip identifier and the phase lag are a function of a frequency of the variable component, and the torque ratio estimating means corrects the frequency of the variable component using the natural frequency.

Further, according to a fifth aspect of the present invention, there is provided a lateral pressure control apparatus for a continuously variable transmission, the apparatus comprising the torque ratio estimating apparatus for a continuously variable transmission according to any one of the first to fourth aspects, wherein the continuously variable transmission comprises a drive pulley provided on the input shaft element, a driven pulley provided on the output shaft element, the transmission element, which is an endless belt wound around the two pulleys, and shift control means that controls the gear ratio of the continuously variable transmission, and the shift control means controls a pulley lateral pressure that is applied to the drive pulley and the driven pulley so that the estimated torque ratio coincides with a target torque ratio.

Furthermore, according to a sixth aspect of the present invention, in addition to the fifth aspect, the shift control means changes the target torque ratio when the speed of operation of an accelerator pedal is outside a predetermined range.

Moreover, according to a seventh aspect of the present invention, in addition to the fifth aspect, the shift control means changes the target torque ratio when the amount of variation in the torque ratio is outside a predetermined range.

An input shaft 11 of an embodiment corresponds to the input shaft element of the present invention, an output shaft 12 of the embodiment corresponds to the output shaft element of the present invention, an endless belt 15 of the embodiment corresponds to the transmission element of the present invention, an engine E of the embodiment corresponds to the drive source of the present invention, a belt type continuously variable transmission TM of the embodiment corresponds to the continuously variable transmission of the present invention, and an electronic control unit U of the embodiment corresponds to the torque ratio estimating means or the shift control means of the present invention.

Effects of the Invention

In accordance with the first aspect of the present invention, when estimating the torque ratio, which is the ratio of the actually transmitted torque relative to the maximum transmittable torque of the continuously variable transmission, based on the transmission characteristics for transmitting the given variable component of the input shaft element to the output shaft element via the frictional element, since at least one of the slip identifier, which is an indicator for difference in amplitude of the variable component between the two elements, and the phase lag, which is an indicator for difference in phase of the variable component between the two elements, is used, it is possible to estimate the torque ratio, which is very closely related to the power transmission efficiency of the continuously variable transmission, with good precision, thus improving the power transmission efficiency. Moreover, since the torque ratio is estimated from the slip identifier or the phase lag, it is possible to minimize the number of sensors necessary for estimation, thus reducing the cost.

Furthermore, in accordance with the second aspect of the present invention, since the torque ratio is estimated by selecting one of the slip identifier and the phase lag according to the frequency band of the variable component, it is possible to increase the precision for estimating torque ratio by selecting the one of the slip identifier and the phase lag that has the larger rate of variation relative to the variation of the torque ratio for each frequency band of the variable component.

Moreover, in accordance with the third aspect of the present invention, since the torque ratio is estimated by correcting a change in transmission characteristics caused by a change in the natural frequency of at least one of the input shaft element, the transmission element, and the output shaft element, it is possible to ensure the precision of estimating the torque ratio even when the natural frequency changes.

Furthermore, in accordance with the fourth aspect of the present invention, the slip identifier and the phase lag are a function of the frequency of the variable component, and correcting the frequency using the natural frequency of at least one of the input shaft element, the transmission element, and the output shaft element enables a torque ratio to be estimated by the same method even when the natural frequency changes, thus simplifying calculation processing, etc. when estimating torque ratio.

Moreover, in accordance with the fifth aspect of the present invention, when controlling by the shift control means the gear ratio of the continuously variable transmission for which the endless belt is wound around the drive pulley provided on the input shaft element and the driven pulley provided on the output shaft element, since the pulley lateral pressure that is applied to the drive pulley and the driven pulley is controlled so that the estimated torque ratio coincides with the target torque ratio, not only is it possible to carry out appropriate control by directly specifying the target torque ratio, but it is also possible to prevent the responsiveness of the pulley lateral pressure from changing depending on the frequency of the variable component.

Furthermore, in accordance with the sixth aspect of the present invention, since the target torque ratio is changed when the speed at which the accelerator pedal is operated is outside a predetermined range, it is possible to improve the power transmission efficiency and the durability of the continuously variable transmission by changing the target torque ratio when the driver suddenly operates the accelerator pedal.

Moreover, in accordance with the seventh aspect of the present invention, since the target torque ratio is changed when the amount of variation in the torque ratio is outside a predetermined range, it is possible to improve the power transmission efficiency and the durability of the continuously variable transmission by changing the target torque ratio when a load is transmitted back from a bad road to the continuously variable transmission.

BRIEF DESCRIPTION OF DRAWINGS

FIG. 12 is a diagram for comparing the result of control of torque ratio in the conventional example and the result of control of torque ratio in the present invention. (first embodiment)

Figure 1:
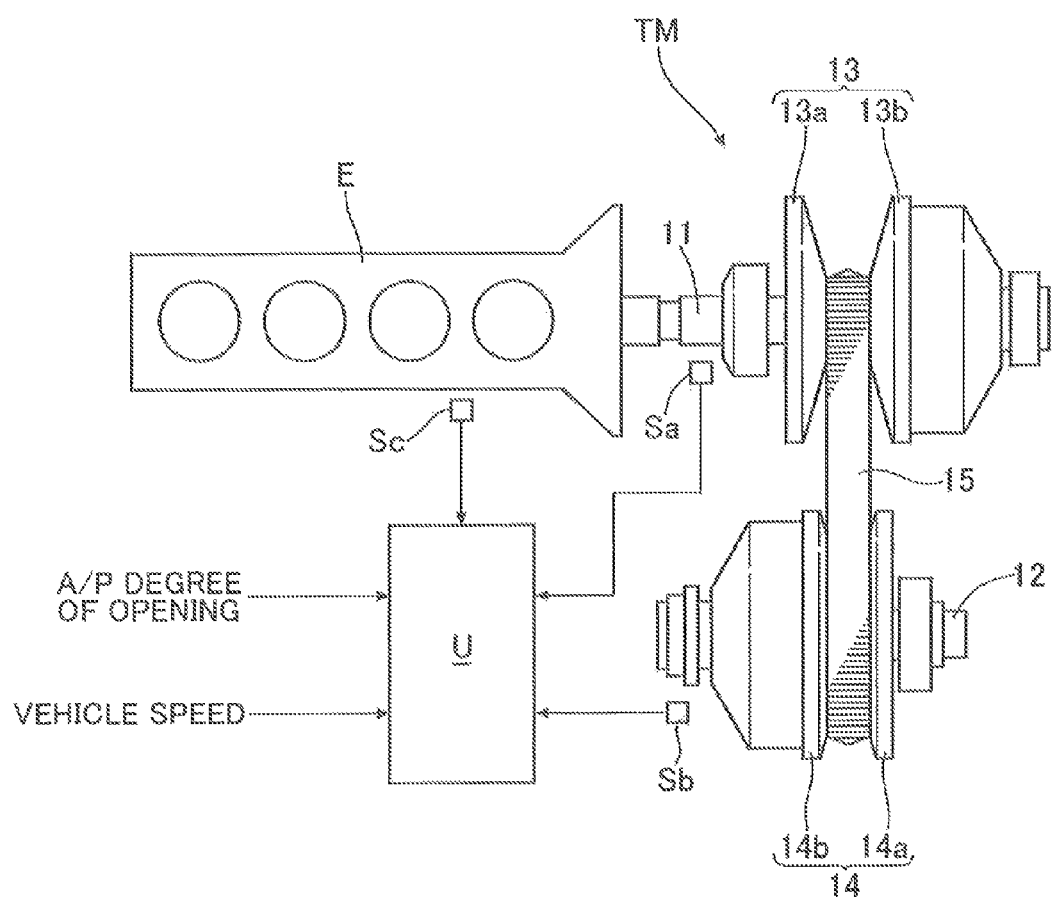
FIG. 1 is a diagram showing the overall structure of a belt type continuously variable transmission. (first embodiment)

EXPLANATION OF REFERENCE NUMERALS
AND SYMBOLS 11 input shaft (input shaft element)
12 Output shaft (output shaft element)
13 Drive pulley
14 Driven pulley
15 Endless belt (transmission element)
F Engine (drive source)
$f_n$ Natural frequency
IDslip Slip identifier
STr Target torque ratio
T Actually transmitted torque
Tmax Maximum transmittable torque
Tr Torque ratio
TM Belt type continuously variable transmission (continuously variable transmission)
U Electronic control unit (torque ratio estimating means, shift control means)
Δφ Phase lag

MODES FOR CARRYING OUT THE INVENTION

A first embodiment of the present invention is explained below by reference to FIG. 1 to FIG. 12.

First Embodiment

As shown in FIG. 1, a belt type continuously variable transmission TM mounted on an automobile includes an input shaft 11 (or an input shaft element) connected to an engine F, an output shaft 12 (or an output shaft element) disposed in parallel to the input shaft 11, a drive pulley 13 provided on the input shaft 11, a driven pulley 14 provided on the output shaft 12, and an endless belt 15 made of metal and wound around the drive pulley 13 and the driven pulley 14. The drive pulley 13 is formed from as fixed side pulley half 13a and a movable side pulley half 13b, and the movable side pulley half 13b is urged by pulley lateral pressure in the direction in which it moves closer to the fixed side pulley half 13a. Similarly, the driven pulley 14 is formed from a fixed side pulley half 14a and a movable side pulley half 141), and the movable side pulley half 14b is urged by pulley lateral pressure in the direction in which it moves closer to the fixed side pulley half 14a. Therefore, by controlling the pulley lateral pressure supplied to the movable side pulley half 13b of the drive pulley 13 and the movable side pulley half 14b of the driven pulley 14 so as to increase the groove width of one of the drive pulley 13 and the driven pulley 14 and decrease the groove width of the other, the gear ratio of the belt type continuously variable transmission TM can be freely changed.

Inputted into an electronic control unit U for controlling the gear ratio of the belt type continuously variable transmission TM are a rotational speed of the input shaft 11 detected by an input shaft rotational speed sensor Sa, a rotational speed of the output shaft 12 detected by an output shaft rotational speed sensor Sb, and a rotational speed of the engine E detected by an engine rotational speed sensor Sc, together with a degree of accelerator opening signal, a vehicle speed signal, etc. The electronic control unit U not only carries out normal gear ratio control in which the pulley lateral pressure of the belt type continuously variable transmission TM is changed based on the degree of accelerator opening signal and the vehicle speed signal but also estimates a torque ratio Tr, which is described later, and carries out control in which the pulley lateral pressure is changed using the torque ratio Tr in order to enhance the power transmission efficiency of the belt type continuously variable transmission TM.

Figure 2:
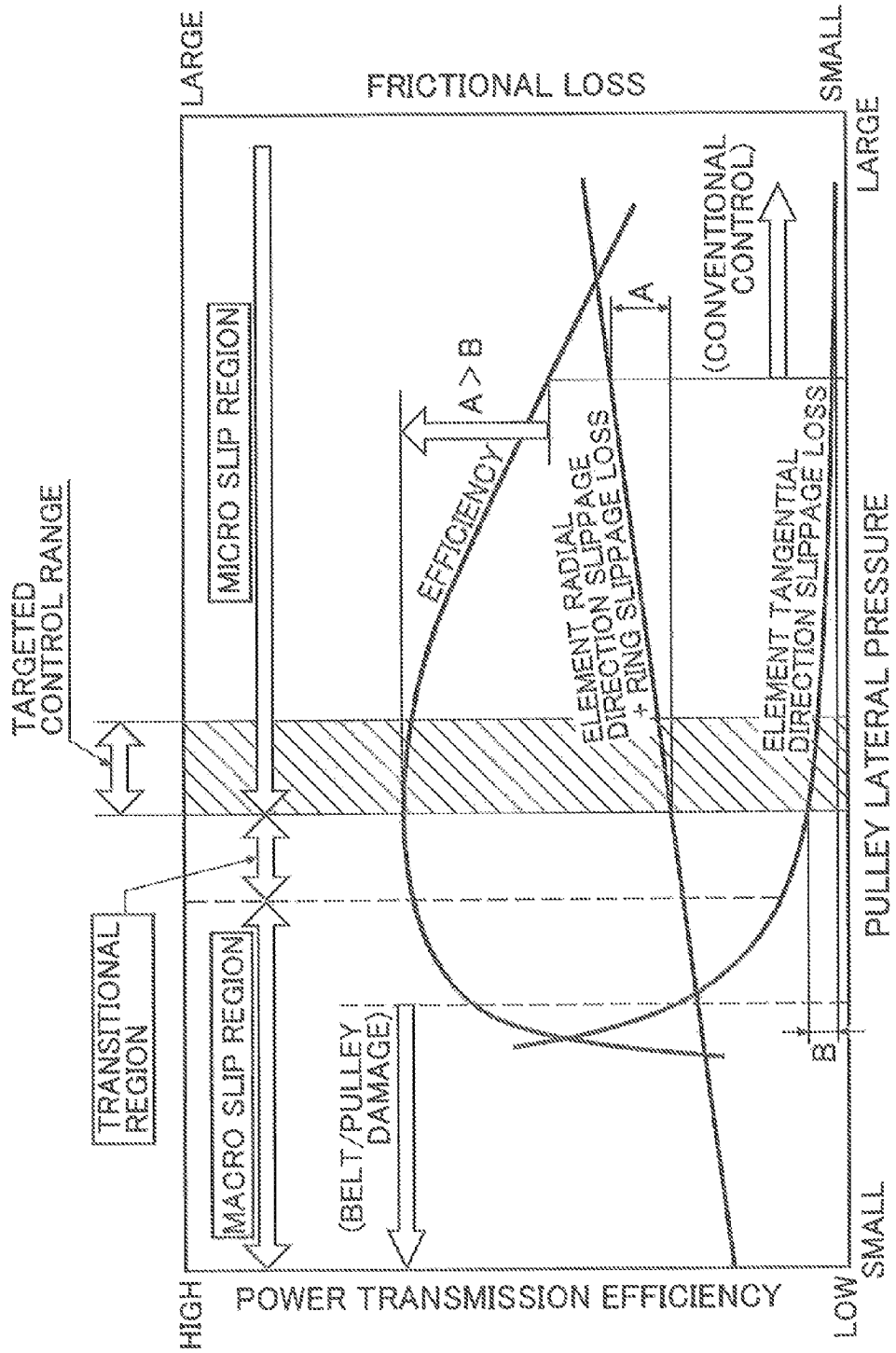
FIG. 2 is a graph showing the relationship between pulley lateral pressure and power transmission efficiency. (first embodiment)

As one means for enhancing the power transmission efficiency of the belt type continuously variable transmission decreasing the pulley lateral pressure applied to the pulley is known. FIG. 2 shows the relationship between pulley lateral pressure and frictional loss and power transmission efficiency; as the pulley lateral pressure decreases, there is a shift from a micro slip region, in which slip between the pulley and the endless belt is small, to a macro slip region, in which slip between the pulley and the endless belt is large, via a transitional region, in the micro slip region, the power transmission efficiency gradually improves as the pulley lateral pressure decreases, but in the transitional region the power transmission efficiency starts decreasing and in the macro slip region the power transmission efficiency decreases rapidly.

The reason therefor is thought to be that although the sum of frictional losses due to slip of a metal ring and slip in the radial direction of a metal element of the endless belt decreases from the micro slip region to the macro slip region at a rate of decrease A, which is constant and relatively large, as the pulley lateral pressure decreases, the frictional loss due to slip in the tangential direction of the metal element increases from the micro slip region to the transitional region at a rate of increase B (A>B), which is substantially constant and relatively small, and rapidly increases in the macro slip region.

In order to obtain maximum power transmission efficiency, it is desirable to control the pulley lateral pressure so that it is in the micro slip region immediately before the transitional region, but if the pulley lateral pressure is decreased excessively, it shifts from the micro slip region into the macro slip region beyond the transitional region, and there is a possibility that there will be a large amount of slip of the endless belt relative to the pulley and the endless belt will be damaged. Therefore, in order to enhance the power transmission efficiency while ensuring the durability of the belt type continuously variable transmission TM, it is necessary to control the pulley lateral pressure with good precision so that it is in the micro slip region immediately before the transitional region.

Because of this, in the present invention, a parameter called torque ratio Tr is introduced. The torque ratio Tr is defined by $$Tr = T/T\max \quad (1)$$

in which T is the torque that is currently transmitted by the belt type continuously variable transmission TM and Tmax is the maximum torque that can be transmitted by the belt type continuously variable transmission TM with the current axial thrust (that is, pulley lateral pressure×pulley piston pressure-receiving area) without slipping. A torque ratio Tr=0 corresponds to a state in which no power transmission is being carried out, a torque ratio Tr=1 corresponds to a state in which the torque that is currently transmitted is saturated, and a torque ratio Tr>1 corresponds to a state in which macro slip might occur or transition thereto is occurring.

Figure 3:
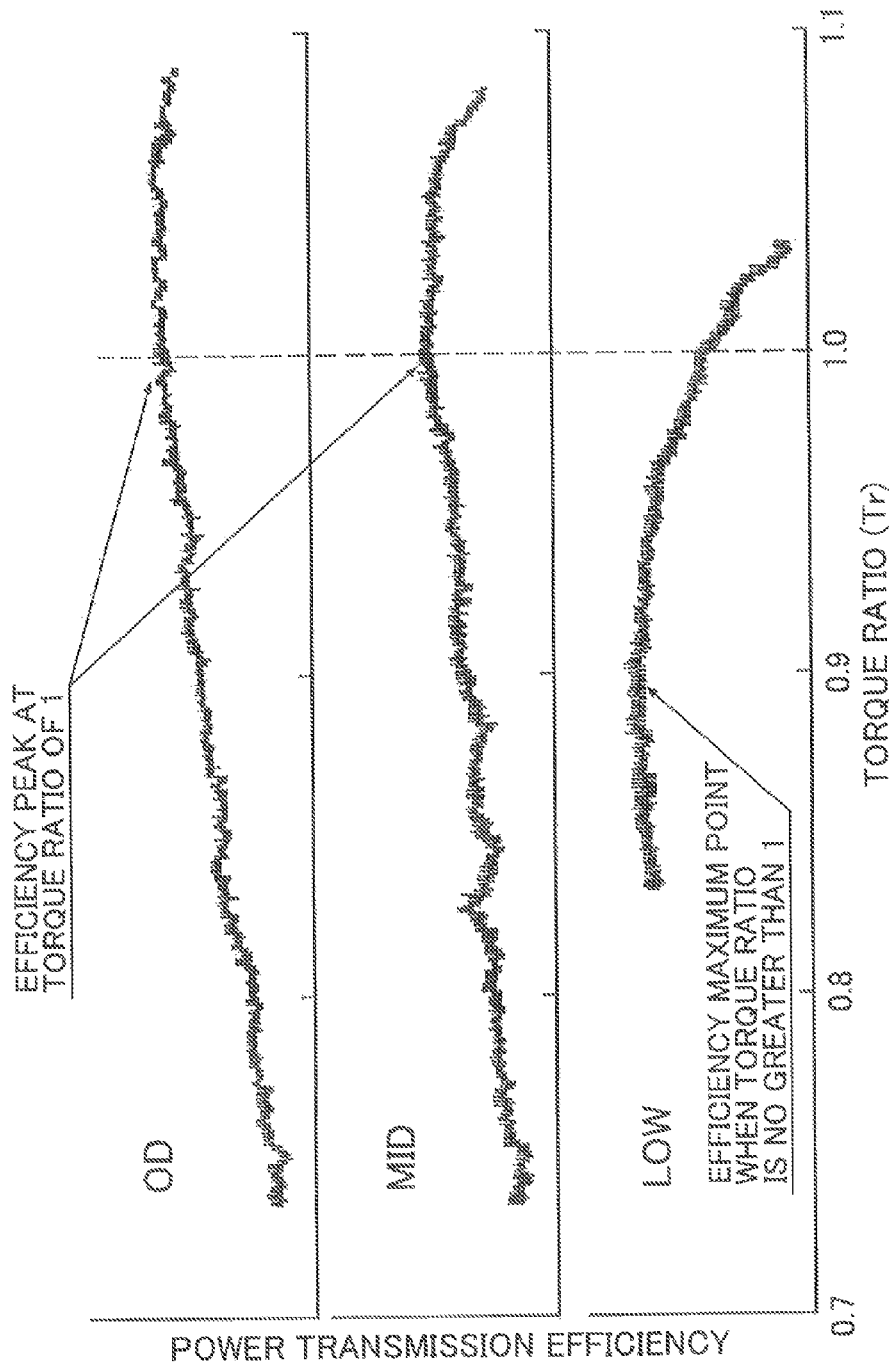
FIG. 3 is a graph showing the relationship between torque ratio and power transmission efficiency. (first embodiment)

As shown in FIG. 3, when the gear ratio is in an OD state and in a MID state, maximum power transmission efficiency is obtained when the torque ratio Tr is 1.0. Furthermore, it can be seen that when the gear ratio is in a LOW state, the torque ratio Tr that gives maximum power transmission efficiency decreases to 0.9, but high power transmission efficiency can still be obtained even when the torque ratio Tr is 1.0. That is, the parameter called torque ratio Tr is very closely related to power transmission efficiency, and controlling the pulley lateral pressure of the belt type continuously variable transmission TM so that the torque ratio Tr is a value close to 1.0 enables the power transmission efficiency to be enhanced and the occurrence of macro slip to be prevented, thus ensuring the durability of the belt type continuously variable transmission TM.

The maximum transmittable torque Tmax necessary for calculating the torque ratio Ti is given by $$Tmax = 2\mu RQ/\cos\alpha \quad (2)$$

where $\mu$ is the coefficient of friction between the pulley and the belt, R is the radius of winding of the belt around the pulley, Q is the axial thrust of the pulley, and $\alpha$ is an angle that is half the V angle of the pulley. In this way, in order to calculate the torque ratio Tr it is necessary to calculate the maximum transmittable torque Tmax, in order to calculate the maximum transmittable torque Tmax it is necessary to detect the coefficient of friction $\mu$ between the pulley and the belt, the radius R of winding of the belt around the pulley, and the axial thrust Q of the pulley, and a large number of sensors are therefore required. Equipping an actual vehicle with these sensors is difficult to achieve from the viewpoint of cost.

The present embodiment estimates the torque ratio Tr from a slip identifier IDslip and a frequency $f_0$ of variation in rotational speed of the input shaft 11 (frequency $f_0$ of variable component) or from a phase lag $\Delta\phi$ and a frequency $f_0$ variation in rotational speed of the input shaft 11 (frequency $f_0$ of variable component). Since the variation in rotational speed of the input shaft 11 is synchronized with variation in the rotational speed of the engine E, the frequency $f_0$ of the variation in rotational speed of the input shaft 11 can be calculated from the engine rotational speed detected by the engine rotational speed sensor Sc, and as described later the slip identifier IDslip and the phase lag $\Delta\phi$ can be calculated from the variation in input shaft rotational speed detected by the input shaft rotational speed sensor Sa and the variation in output shaft rotational speed detected by the output shaft rotational speed sensor Sb, it is possible to estimate the torque ratio Tr by means of a minimum number of sensors with good precision.

Figure 4:
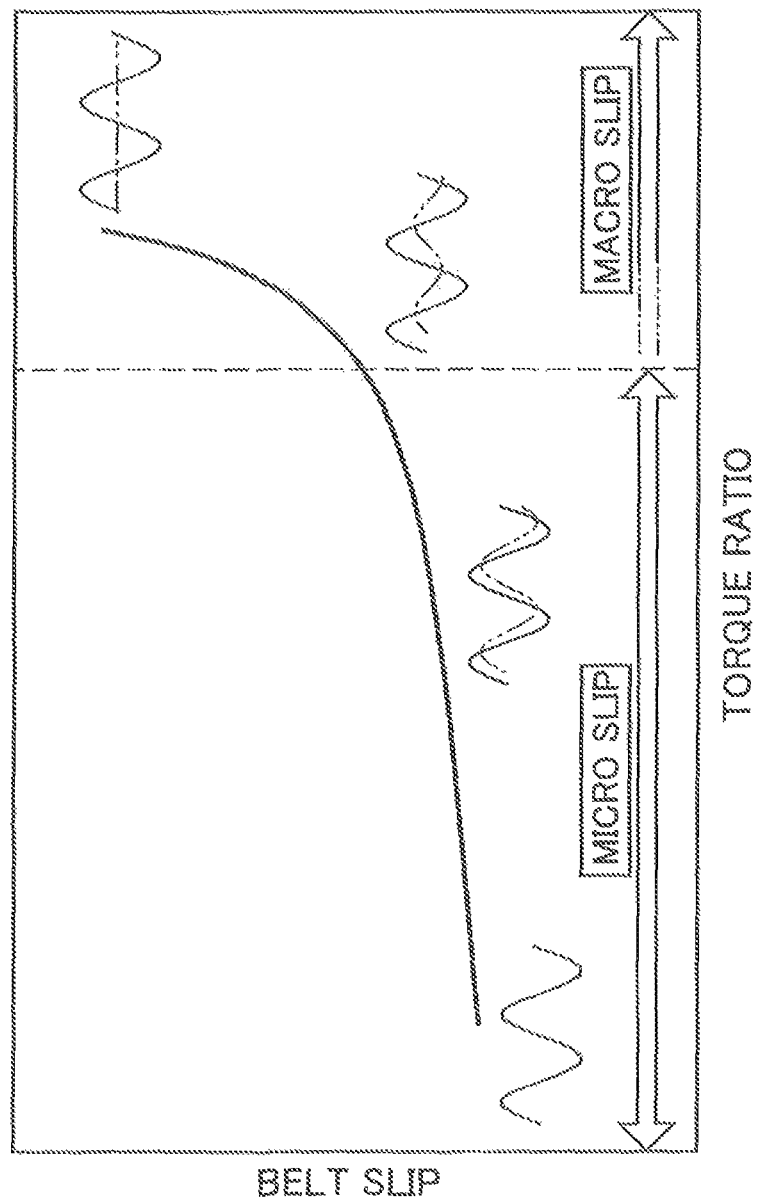
FIG. 4 is a diagram showing the relationship between torque ratio and belt slip. (first embodiment)

The slip identifier IDslip and the phase lag $\Delta\phi$ are now explained. As shown in FIG. 4, accompanying an increase in the torque ratio Tr, the amount of slip of the belt increases in the micro slip region little by little, and in the macro slip region the amount of slip of the belt increases rapidly. Since the variation in rotational speed of the input shaft 11 is transmitted via the endless belt 15 to the output shaft 12, which is connected to the input shaft 11 via the endless belt 15, a variation in rotational speed with the same frequency is generated in the output shaft 12. When there is no slip at all between the belt and the pulley, the waveform of variation of the input shaft rotational speed coincides with the waveform of variation of the output shaft rotational speed, but if the amount of slip increases accompanying an increase in the torque ratio Tr, the amplitude of the waveform of variation of the output shaft rotational speed becomes small relative to the amplitude of the waveform of variation of the input shaft rotational speed, and the phase of the waveform of variation of the output shaft rotational speed lags relative to the phase of the waveform of variation of the input shaft rotational speed.

Figure 5:
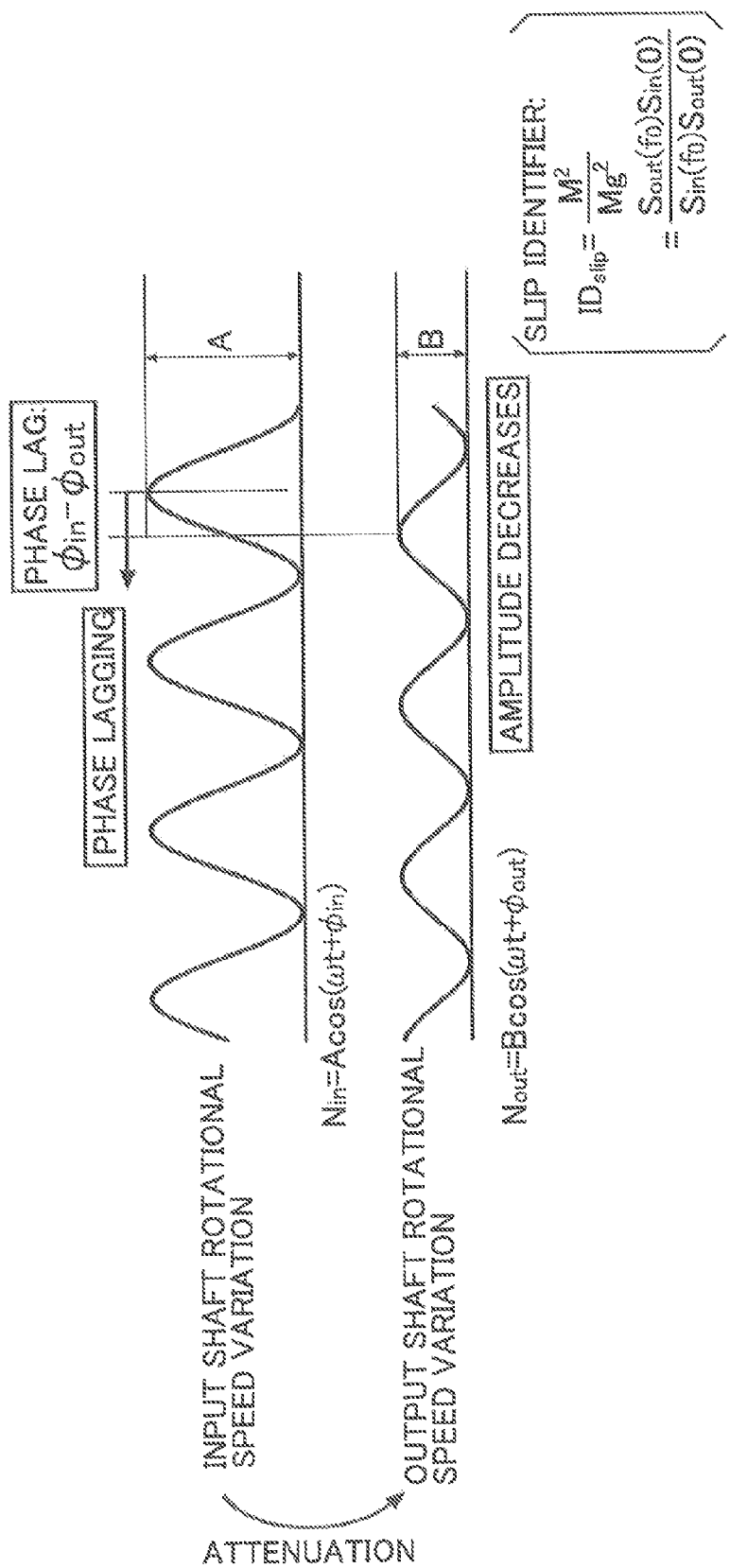
FIG. 5 is a diagram showing the waveform of input shaft rotational speed variation and the waveform of output shaft rotational speed variation. (first embodiment)

In FIG. 4 and FIG. 5, it can be seen that, with respect to the waveform of variation of the input shaft rotational speed shown by the solid line, the waveform of variation of the output shaft rotational speed shown by the broken line gradually decreases in amplitude and gradually lags in phase in response to an increase in the torque ratio Tr. The vibration waveform of the input shaft rotational speed is given by $$N\text{in} = A\cos(\omega t + \phi\text{in}) \quad (3),$$

and the vibration waveform of the output shaft rotational speed is given by $$N\text{out} = B\cos(\omega t + \phi\text{out}) \quad (4).$$

That is, with respect to the vibration waveform of the input shaft rotational speed, the vibration waveform of the output shaft rotational speed decreases in amplitude from A to B and lags in phase by $\phi\text{in} - \phi\text{out}$.

A method for calculating the slip identifier IDslip is now explained.

First, the frequency $f_0$ of variation of the rotational speed of the input shaft 11 is calculated from the equation below using a number n of cylinders of the engine E and a direct current component Ne of the engine rotational speed. The direct current component Ne of the engine rotational speed can be detected by the engine rotational speed sensor Sc, which is always mounted on a normal engine E.

[Equation 1]

$$f_0 = \frac{nNe}{120}[\text{Hz}] \quad (5)$$

n: number of cylinders of engine
Ne: direct current component [rpm] of engine rotational speed The slip identifier IDslip is formed by indicating an amplitude ratio M between the input shaft 11 and the output shaft 12 at the frequency $f_0$ of variation using an amplitude ratio Mg when there is no geometric response from the belt type continuously variable transmission TM, that is, there is no influence from slip or excitation, and is defined by the equation below.

[Equation 2]

$$ID_{slip} = \left(\frac{M}{Mg}\right)^2 \quad (6)$$

M: amplitude ratio
Mg: amplitude ratio determined by geometric conditions

The amplitude ratio M, which is a function of the frequency $f_0$ of variation of the rotational speed of the input shaft 11, is defined by the equation below; the frequency $f_0$ variation can be calculated from the engine rotational speed outputted by the engine rotational speed sensor Sc, $\text{Sin}(f_0)$ is a power spectrum of the waveform of variation of the input shaft rotational speed and can be calculated from the output of the input shaft rotational speed sensor Sa, and $\text{Sout}(f_0)$ is a power spectrum of the waveform of variation of the output shaft rotational speed and can be calculated from the output of the output shaft rotational speed sensor Sb.

[Equation 3]

$$M(f_0) = \sqrt{\frac{S_{out}(f_0)}{S_{in}(f_0)}} \quad (7)$$

$S_{in}$: power spectrum of variation of input shaft
$S_{out}$: power spectrum of variation of output shaft Furthermore, the amplitude ratio Mg under geometric conditions is approximately represented by the ratio of direct current components of the output signal and input signal when slip generated in the belt type continuously variable transmission TM is small, and is defined by the equation below.

[Equation 4]

$$Mg = \sqrt{\frac{S_{out}(0)}{S_{in}(0)}} \quad (8)$$

The amplitude ratio Mg under geometric conditions depends on the physical quantity used as the variable component of the input shaft 11 and the output shaft 12. Since in the present embodiment the rotational speed variation is used as the variable component, it is given by Mg=1/i where the gear ratio of the belt type continuously variable transmission TM is i. When torque variation is used as the variable component of the input shaft 11 and the output shaft 12, it is given by Mg=i. The gear ratio i of the belt type continuously variable transmission TM can be calculated from the output of the input shaft rotational speed sensor Sa and the output of the output shaft rotational speed sensor Sb.

Based on the above, Equation (6) is rewritten so as to give the equation below, and the slip identifier IDslip can be calculated from outputs of the input shah rotational speed sensor Sa and the output shaft rotational speed sensor Sb, which are already present in the belt type continuously variable transmission TM, and the output of the engine rotational speed sensor Sc, which is already present in the engine E.

[Equation 5]

$$ID_{slip} = \frac{S_{out}(f_0)S_{in}(0)}{S_{in}(f_0)S_{out}(0)} \quad (9)$$

Furthermore, the phase lag $\Delta\phi$ is defined by the equation below; the phase $\phi$in of the waveform of variation of the input shaft rotational speed can be calculated from the output of the input shaft rotational speed sensor Sa, and the phase $\phi$out of the waveform of variation of the output shaft rotational speed can be calculated from the output of the output shaft rotational speed sensor Sb.

[Equation 6]

$$\Delta\phi = \phi_{in}(f_0) - \phi_{out}(f_0) \quad (10)$$

Figure 6:
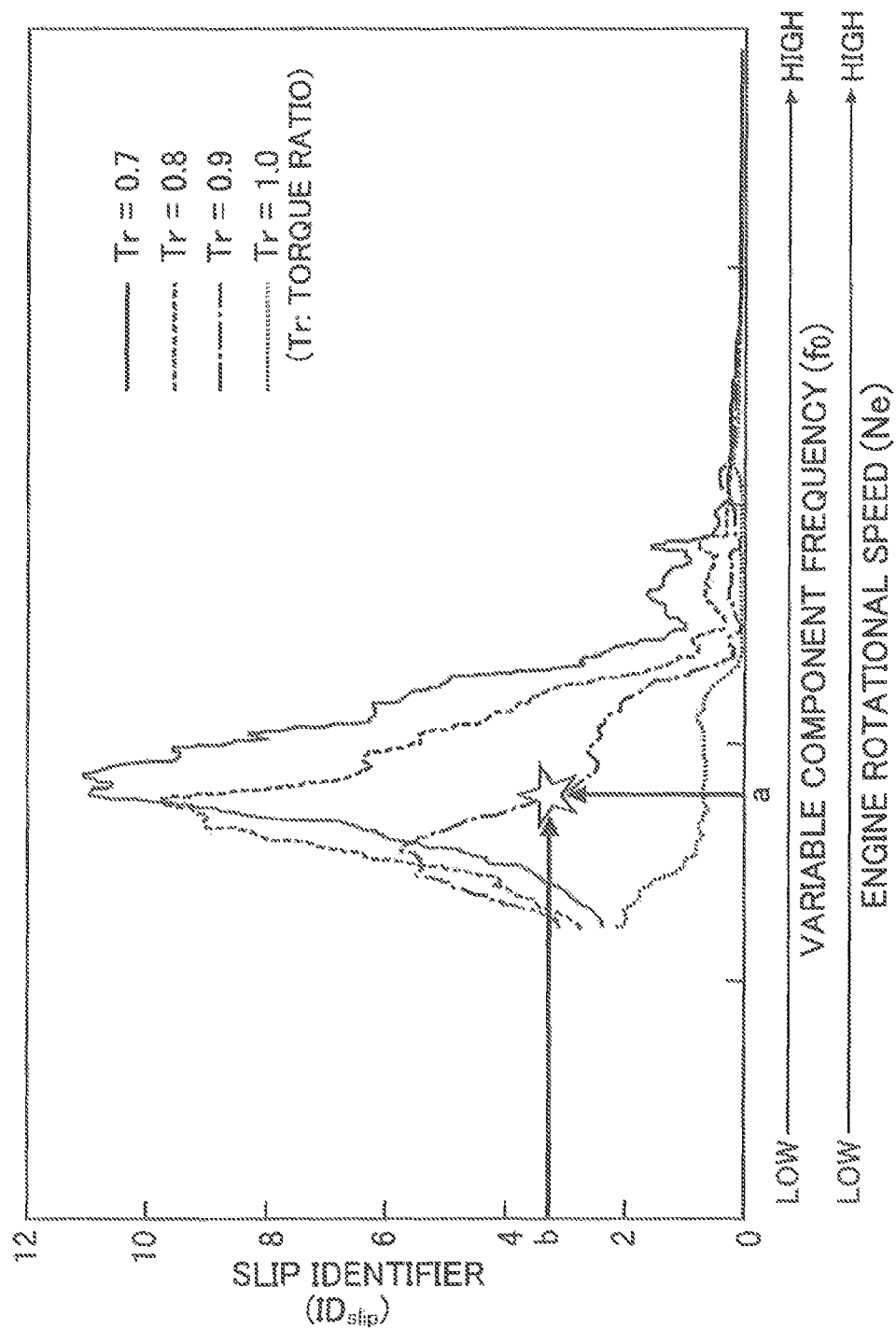
FIG. 6 is a diagram showing a map via which torque ratio is looked up from variable component frequency and slip identifier. (first embodiment)

$\phi_{in}$: phase of variation of input shaft
$\phi_{out}$: phase of variation of output shaft FIG. 6 is a map in which the abscissa is the frequency $f_0$ of the variable component of the input shaft rotational speed (or the engine rotational speed Ne) and the ordinate is the slip identifier IDslip; when the torque ratio Tr is changed to 0.7, 0.8, 0.9, or 1.0, the corresponding characteristic line of the slip identifier IDslip changes. From this map, when the slip identifier IDslip and the frequency $f_0$ of the variable component of the belt type continuously variable transmission TM are determined at a give time, it is possible to estimate the torque ratio Tr at the given time from these values. For example, when the value for the frequency $f_0$ of the variable component is a and the value for the slip identifier IDslip is b, the torque ratio Tr becomes 0.9, which corresponds to the line shown by the single dotted line.

Figure 7:
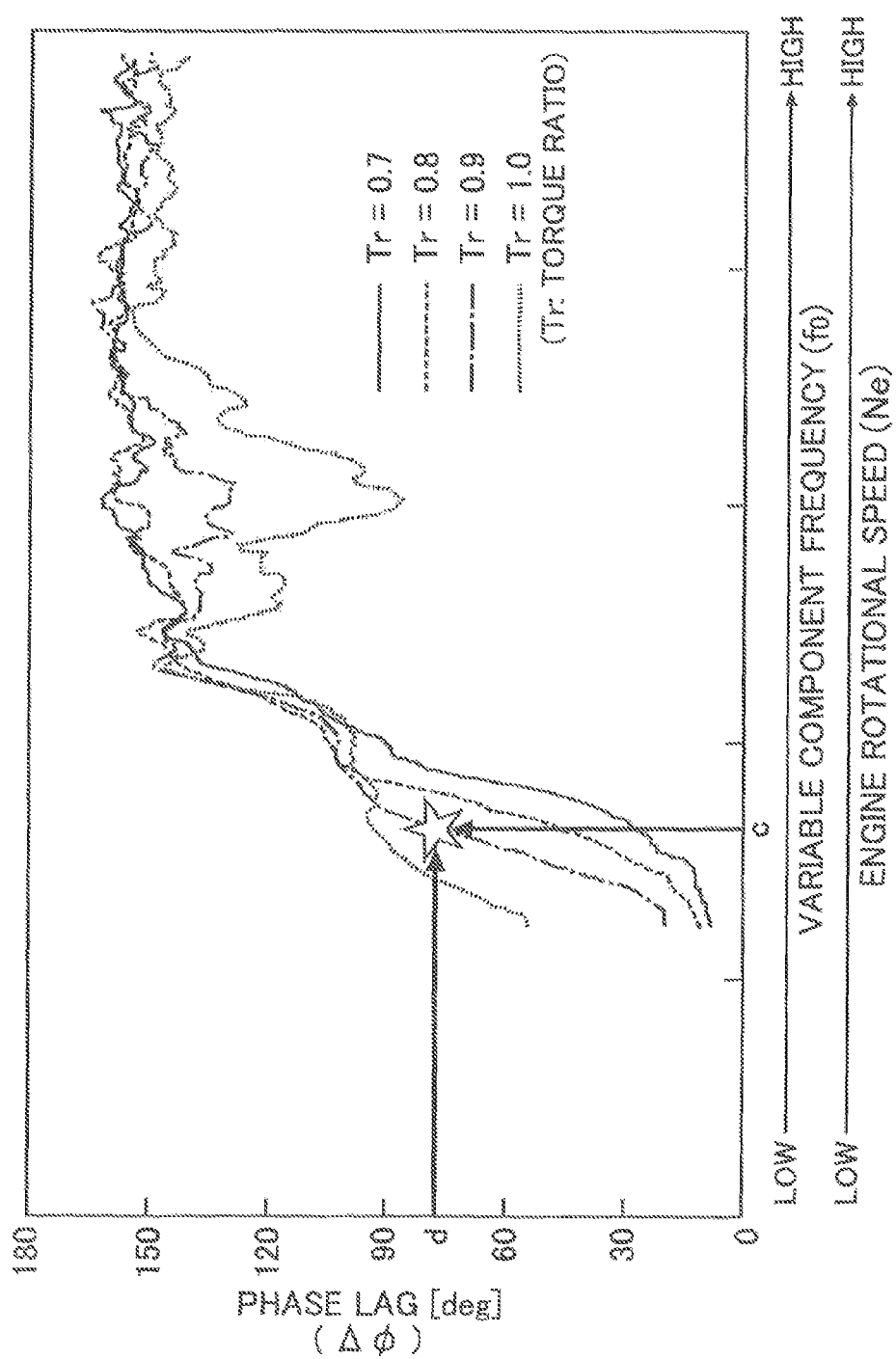
FIG. 7 is a diagram showing a map via which torque ratio is looked up from variable component frequency and phase lag. (first embodiment)

FIG. 7 is a map in which the abscissa is the frequency $f_0$ of the variable component of the input shaft rotational speed (or the engine rotational speed Ne) and the ordinate is the Phase lag $\Delta\phi$; when the torque ratio Tr is changed to 0.7, 0.8, 0.9, or 1.0, the corresponding characteristic line of the phase lag $\Delta\phi$ changes. From this map, when the phase lag $\Delta\phi$ and the frequency $f_0$ of the variable component of the belt type continuously variable transmission TM are determined at a given time, it is possible to estimate the torque ratio Tr at the given time from these values. For example, when the value for the frequency $f_0$ of the variable component is c and the value for the phase lag $\Delta\phi$ is d, the torque ratio Tr becomes 0.9, which corresponds to the line shown by the single dotted line.

Figure 8:
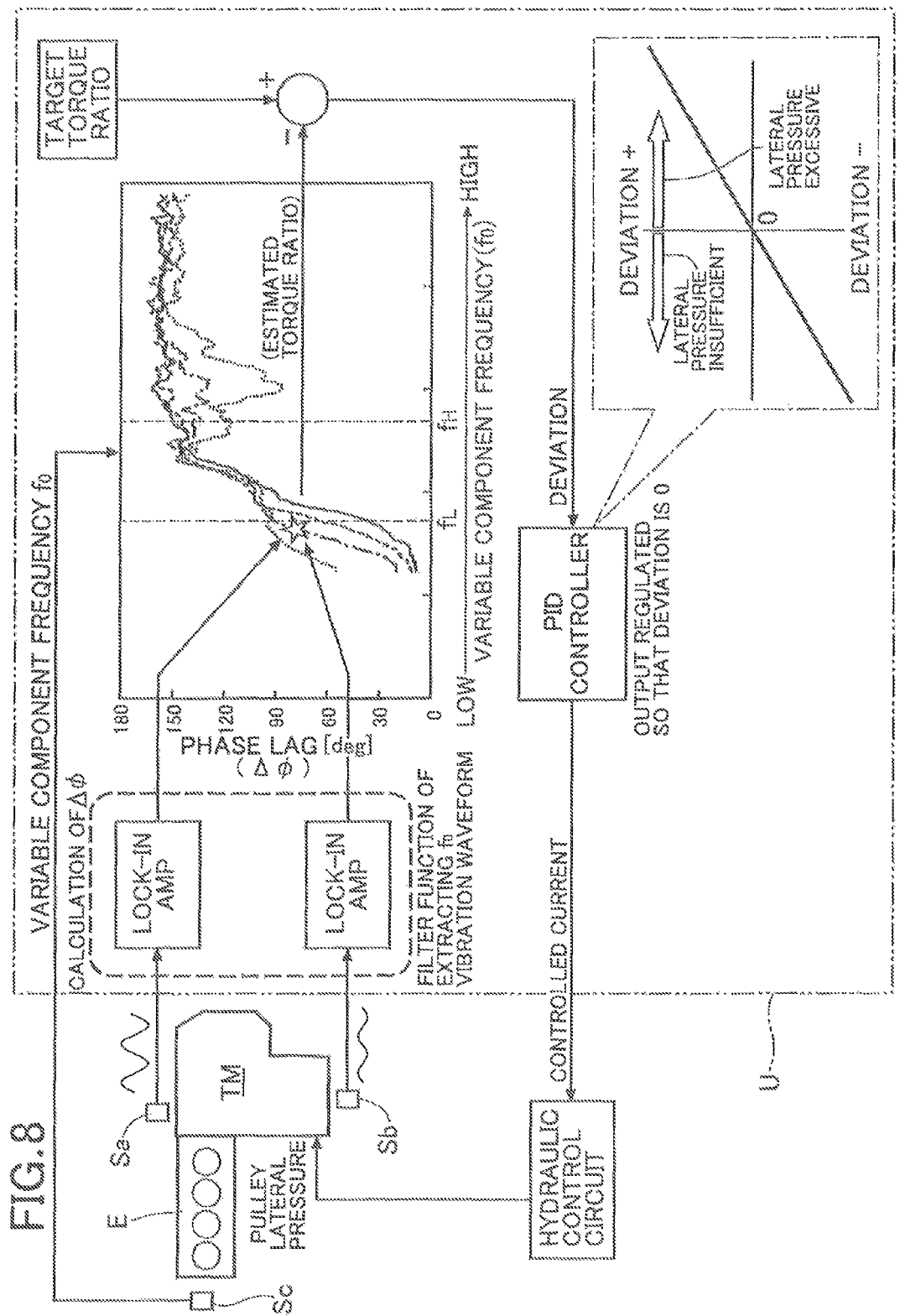
FIG. 8 is a block diagram for a pulley lateral pressure control system. (first embodiment)

As shown in FIG. 8, the electronic control unit U calculates the frequency $f_0$ of the variable component corresponding to the engine rotational speed detected by the engine rotational speed sensor Sc, extracts a vibration waveform corresponding to the frequency $f_0$ by making outputs of the input shaft rotational speed sensor Sa and the output shaft rotational speed sensor Sb pass through a lock-in amp having a filter function, and calculates the slip identifier IDslip and the phase lag $\Delta\phi$ from these vibration waveforms on the input side and the output side. Subsequently, looking up from the map using the slip identifier IDslip or the phase lag $\Delta\phi$ (phase lag $\Delta\phi$ in the example of FIG. 8) and the frequency $f_0$ of the variable component as parameters allows the torque ratio Tr at the given time to be estimated.

A PID controller, into which is inputted a deviation between the estimated torque ratio Tr and the target torque ratio STr, outputs a control signal for making the deviation converge to zero, a hydraulic control circuit, into which the control signal is inputted, generates a pulley lateral pressure for controlling the torque ratio Tr in either one of the drive pulley and the driven pulley of the belt type continuously variable transmission TM, and the other pulley lateral pressure is controlled so as to appropriately maintain the gear ratio. As a result, the torque ratio Tr of the belt type continuously variable transmission TM is subjected to feedback control so that it coincides with the target torque ratio STr. Therefore, if the target torque ratio STr is set at for example 1.0, it is possible to prevent macro slip from being generated between the belt and the pulley while maximizing the power transmission efficiency, thus enhancing the durability of the belt type continuously variable transmission TM.

Figure 9:
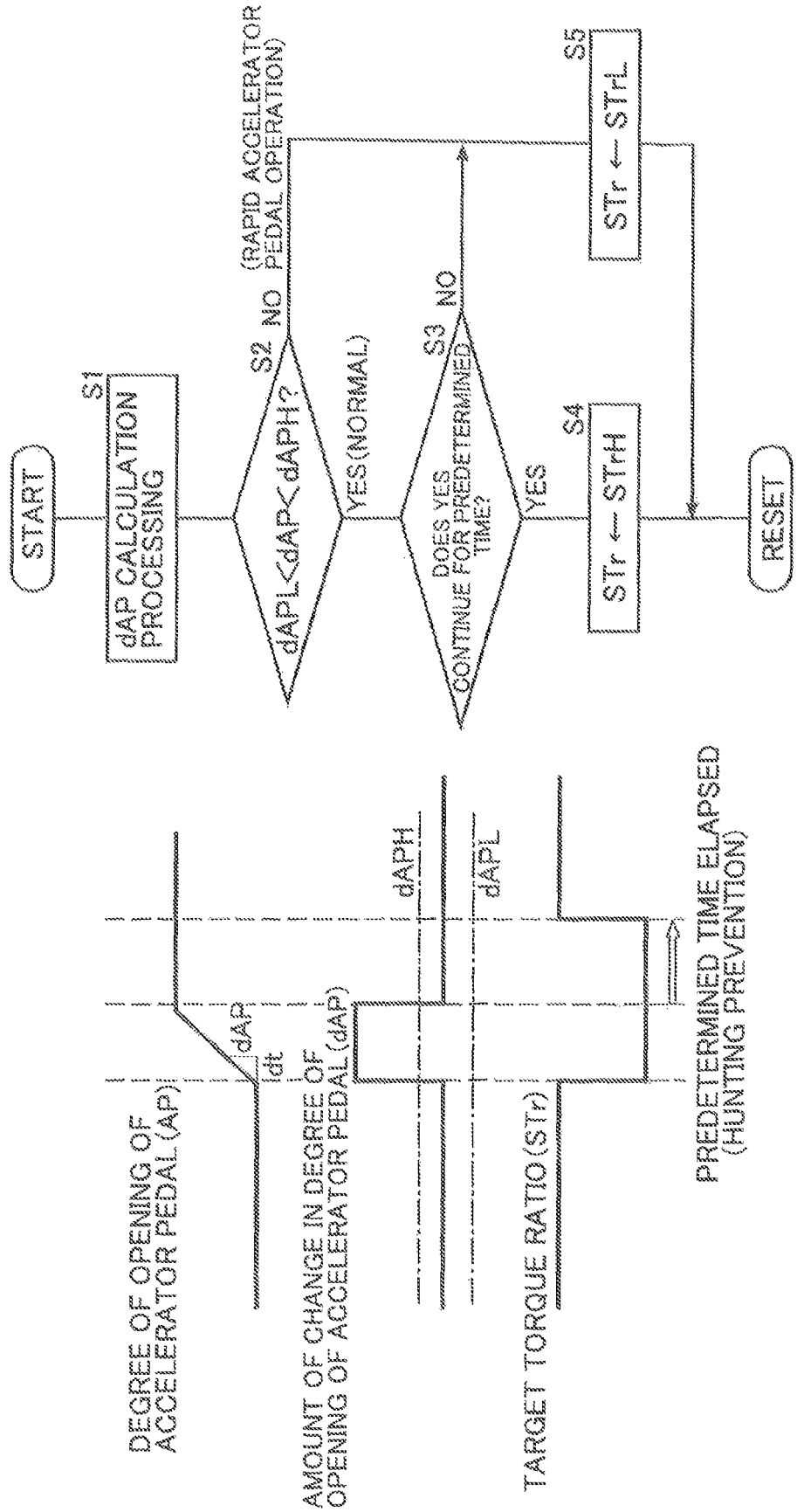
FIG. 9 is a diagram showing one example of setting of a target torque ratio. (first embodiment)

One example of setting of the target torque ratio STr is now explained by reference to FIG. 9.

First, in step S1 the percentage change dAP of the degree of accelerator opening AP is calculated, and if in step S2 it is determined, because of the percentage change dAP of the degree of accelerator opening deviating from dAPL<dAP<dAPH, that an accelerator pedal is rapidly depressed or the accelerator pedal is rapidly returned, then in step S5 the target torque ratio STr is decreased to a low torque ratio STrL. If in step S2 above the percentage change dAP of the degree of accelerator opening returns into the range dAPL<dAP<dAPH and in step S3 its state continues for a predetermined time, in step S4 the target torque ratio STr is increased to a high torque ratio STrH.

By so doing, the power transmission efficiency is improved by setting the target torque ratio STr high when the situation is normal so as to decrease the pulley lateral pressure, and when there is a possibility of slip occurring between the pulley and the belt of the belt type continuously variable transmission TM due to the accelerator pedal being operated rapidly, the belt type continuously variable transmission TM can be protected by setting the target torque ratio STr low so as to increase the pulley lateral pressure. Furthermore, by imparting hysteresis in step S3 above it is possible to prevent the target torque ratio STr from being frequently switched over.

Figure 10:
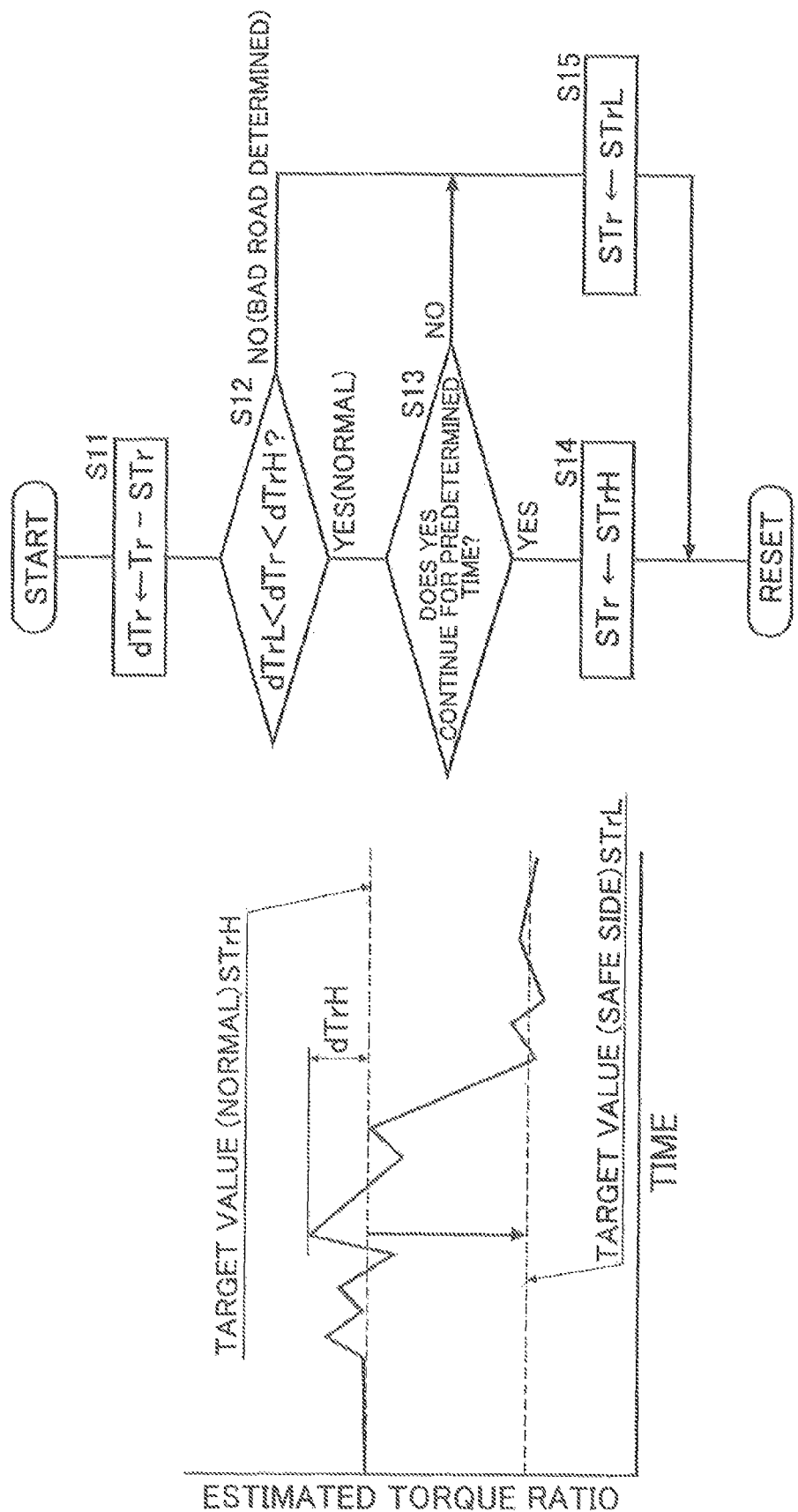
FIG. 10 is a diagram showing another example of setting of a target torque ratio. (first embodiment)

Another example of setting, of the target torque ratio STr is now explained by reference to FIG. 10.

First, in step S11 a deviation dTr of the estimated torque ratio Tr from the target torque ratio STr is calculated, and if in step S12 it is determined, because of the torque ratio deviation dTr deviating from the range dTrL<dTr<dTrH, that as the vehicle is traveling on a bad road and a load that is transmitted back from the road surface to the belt type continuously variable transmission TM varies greatly, then in step S15 the target torque ratio STr is decreased to the low torque ratio STrL. If in step S12 above the torque ratio deviation dTr returns to the range dTrL<dTr<dTrH and in step S13 that state continues for a predetermined time, then in step S14 the target torque ratio STr is increased to the high torque ratio STrH.

By so doing, when the situation is normal the target torque ratio STr is set high to thus reduce the pulley lateral pressure, thereby improving the power transmission efficiency, and when there is a possibility of slip occurring between the belt and the pulley of the belt type continuously variable transmission TM when traveling on a bad road due to the load from the road surface, the target torque ratio STr is set low to thus increase the pulley lateral pressure, thereby protecting the belt type continuously variable transmission TM. Furthermore, by imparting hysteresis in step S13 above it is possible to prevent the target torque ratio STr from being frequently switched over.

The invention described in Patent Document 1 above (hereinafter, called a comparative example) carries out feedback control of pulley lateral pressure so as to make the slip identifier IDslip converge to a target slip identifier or carries out feedback control of pulley lateral pressure so as to make the phase lag $\Delta\phi$ converge to a target phase lag, and since the slip identifier IDslip or the phase lag $\Delta\phi$ is correlated with the torque ratio Tr at each frequency $f_0$ of a variable component, it is also possible in the comparative example to make the torque ratio Tr indirectly converge to the target torque ratio STr. However, in the comparative example, when the frequency $f_0$ of a variable component changes, due to the percentage variation of the slip identifier IDslip and the phase lag $\Delta\phi$ relative to variation of the torque ratio Tr being different, there are the following problems.

Figure 11:
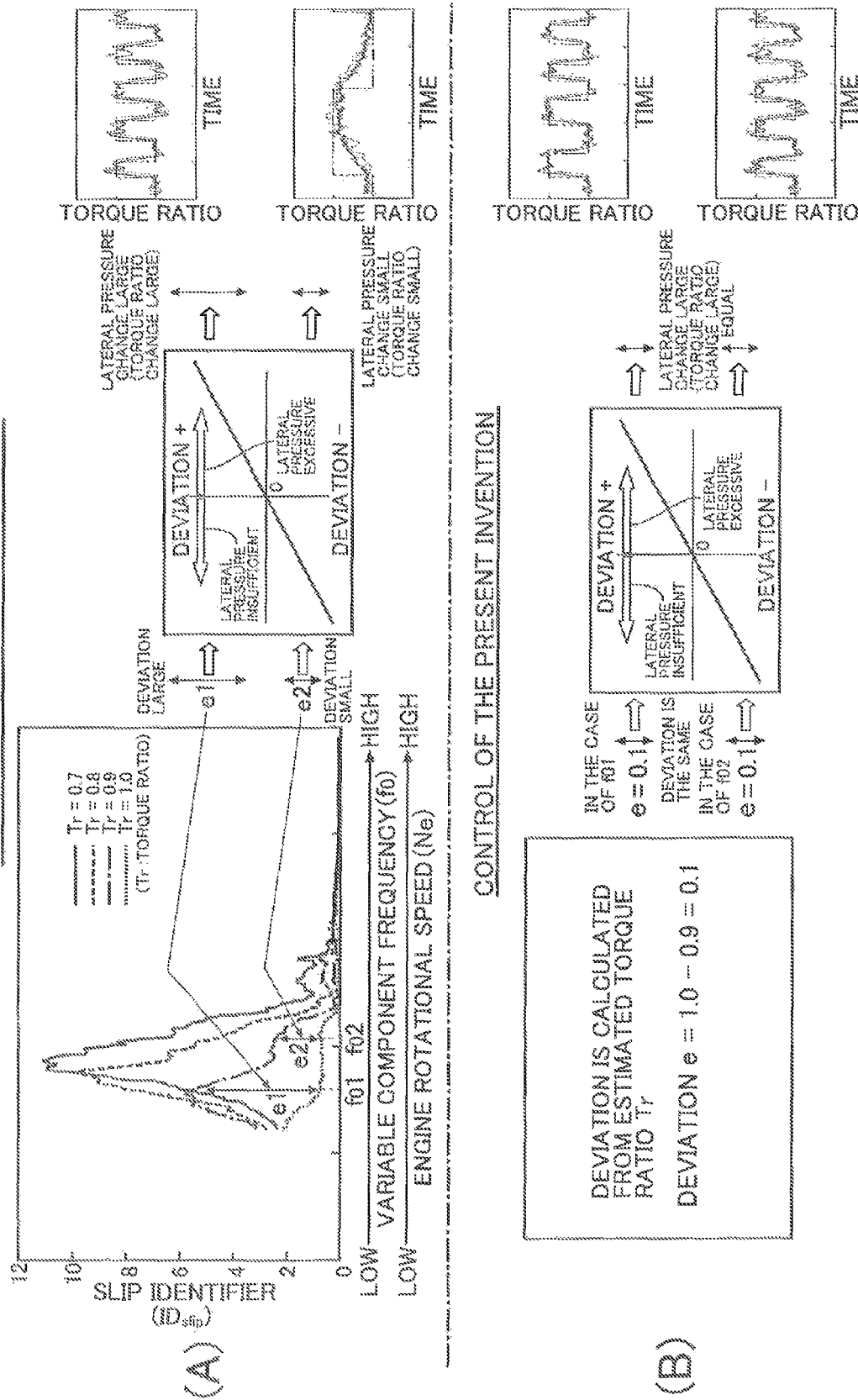
FIG. 11 is a diagram for comparing control of a conventional example and control of the present invention. (first embodiment)

For example, in the comparative example, a case in which, as shown in FIG. 11 (A), a command to change the torque ratio Tr from 0.9 to 1.0 is outputted is considered; when the frequency $f_0$ of the variable component is $f_01$, which is relatively low, a deviation e1 between a slip identifier IDslip corresponding to a torque ratio Tr=0.9 and a slip identifier IDslip corresponding to a torque ratio Tr=1.0 becomes relatively large, whereas when the frequency $f_0$ of the variable component is $f_02$, which is relatively high, a deviation e2 between a slip identifier IDslip at a torque ratio Tr=0.9 and a slip identifier IDslip at a torque ratio Tr=1.0 becomes relatively small. Therefore, the responsiveness of the torque ratio Tr changes when the pulley lateral pressure is subjected to feedback control based on the deviations e1 and e2, and it becomes impossible to ensure a rapid response over the entire rotational speed region of the engine E.

That is, when the target torque ratio STr (command value) is changed in a rectangular pulse shape between 0.7 and 0.8, as shown in FIG. 12 (A) if the frequency $f_0$ of the variable component is $f_01$=15.6 Hz, which is relatively low, the estimated torque ratio Tr and the actual torque ratio Tr have relatively high responsiveness, whereas as shown in FIG. 12 (B) if the frequency $f_0$ of the variable component is $f_02$=22.2 Hz, which is relatively high, the responsiveness of the estimated torque ratio Tr and the actual torque ratio Tr decreases greatly.

In contrast thereto, in accordance with the present embodiment, as shown in FIG. 11 (B), since the torque ratio itself is the target value STr, it will be understood that even if the frequency $f_0$ of the variable component changes, the deviation e when the target torque ratio STr (command value) is changed between 0.7 and 0.8 is a constant value of 0.1, and as shown in FIG. 12 (C) and FIG. 12 (D), regardless of whether the frequency $f_0$ of the variable component is either 15.6 Hz or 22.2 Hz, the responsiveness of the estimated torque ratio Tr and the responsiveness of the actual torque ratio Tr are both high; moreover, the ability to follow also improves compared with control in the comparative example as shown in FIG. 12 (A) and FIG. 12 (B).

As described above, in accordance with the present embodiment, when estimating the torque ratio Tr of the belt type continuously variable transmission TM based on the transmission characteristics involved in transmitting a variable component of the input shaft 11 to the output shaft 12 via the endless belt 15, since at least one of the slip identifier IDslip, which is an indicator for difference in amplitude of the variable component between the input shaft 11 and the output shaft 12, and the phase lag $\Delta\phi$, which is an indicator for difference in phase of the variable component between the input shaft 11 and the output shaft 12, is used, it is possible to estimate the torque ratio Tr, which is very closely related to the power transmission efficiency of the belt type continuously variable transmission TM, with good precision, thus improving the power transmission efficiency. Moreover, since the torque ratio Tr is estimated from the slip identifier IDslip or the phase lag $\Delta\phi$, it is possible to minimize the number of sensors necessary for the estimation, thus reducing the cost. Furthermore, since the pulley lateral pressure that is applied to one of the drive pulley 13 and the driven pulley 14 is controlled so that the estimated torque ratio Tr coincides with the target torque ratio STr, not only is it possible to carry out appropriate control by directly specifying the target torque ratio Tr, but it is also possible to prevent the responsiveness of the pulley lateral pressure from changing depending on the frequency $f_0$ of the variable component. As a result, the power transmission efficiency of the belt type continuously variable transmission TM on its own improves by 1.8%, and the fuel economy improves by 3.8%.

Figure 13:
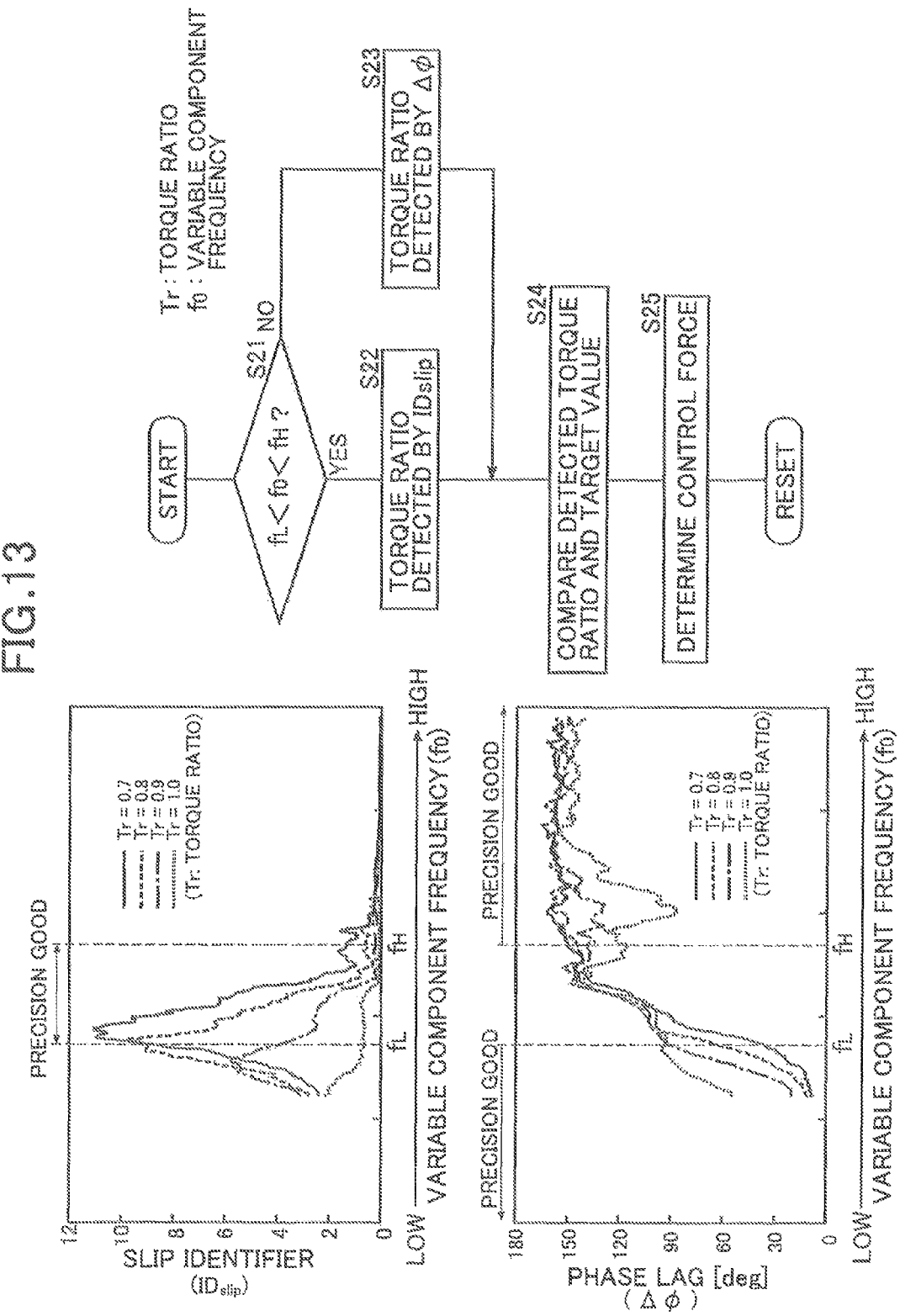
FIG. 13 is a diagram for explaining a method for estimating torque ratio. (second embodiment)

A second embodiment of the present invention is now explained by reference to FIG. 13.

Second Embodiment

As is clear from a map via which a torque ratio Tr is looked up based on a frequency $f_0$ of a variable component and a slip identifier IDslip, in an intermediate region ($f_L<f_0<f_H$) of the frequency $f_0$ of the variable component, the vertical gap of characteristic lines of torque ratios Tr is large, in other regions the gap is small, and the precision for estimating the torque ratio Tr therefore improves in the region of $f_L<f_0<f_H$. Furthermore, as is clear from a map via which a torque ratio Tr is looked up based on a frequency $f_0$ of a variable component and a phase lag $\Delta\phi$, the vertical gap of characteristic lines of torque ratios Tr is large in a region ($f_0 \leq f_L$) in which the frequency $f_0$ of the variable component is low and in a region ($f_0 \geq f_H$) in which it is high, and the gap is small in the other region, and the precision for estimating the torque ratio Tr therefore improves in the region $f_0 \leq f_L$ and the region $f_0 \geq f_H$.

From the above, if in step S21 $f_L<f_0<f_H$ is satisfied, then in step S22 the torque ratio Tr is looked up in the map having the frequency $f_0$ of the variable component and the slip identifier IDslip as parameters, and if in step S21 above $f_0 \leq f_L$ or $f_0 \geq f_H$ is satisfied, then in step S23 the torque ratio Tr is looked up in the map having the frequency $f_0$ of the variable component and the phase lag $\Delta\phi$ as parameters. In step S24 the torque ratio Tr is compared with a target torque ratio STr, and in step S25 pulley lateral pressure is controlled based on a deviation therebetween, thereby enabling control with higher precision to be carried out.

A third embodiment of the present invention is now explained by reference to FIG. 14 and FIG. 15.

Third Embodiment

Figure 14:
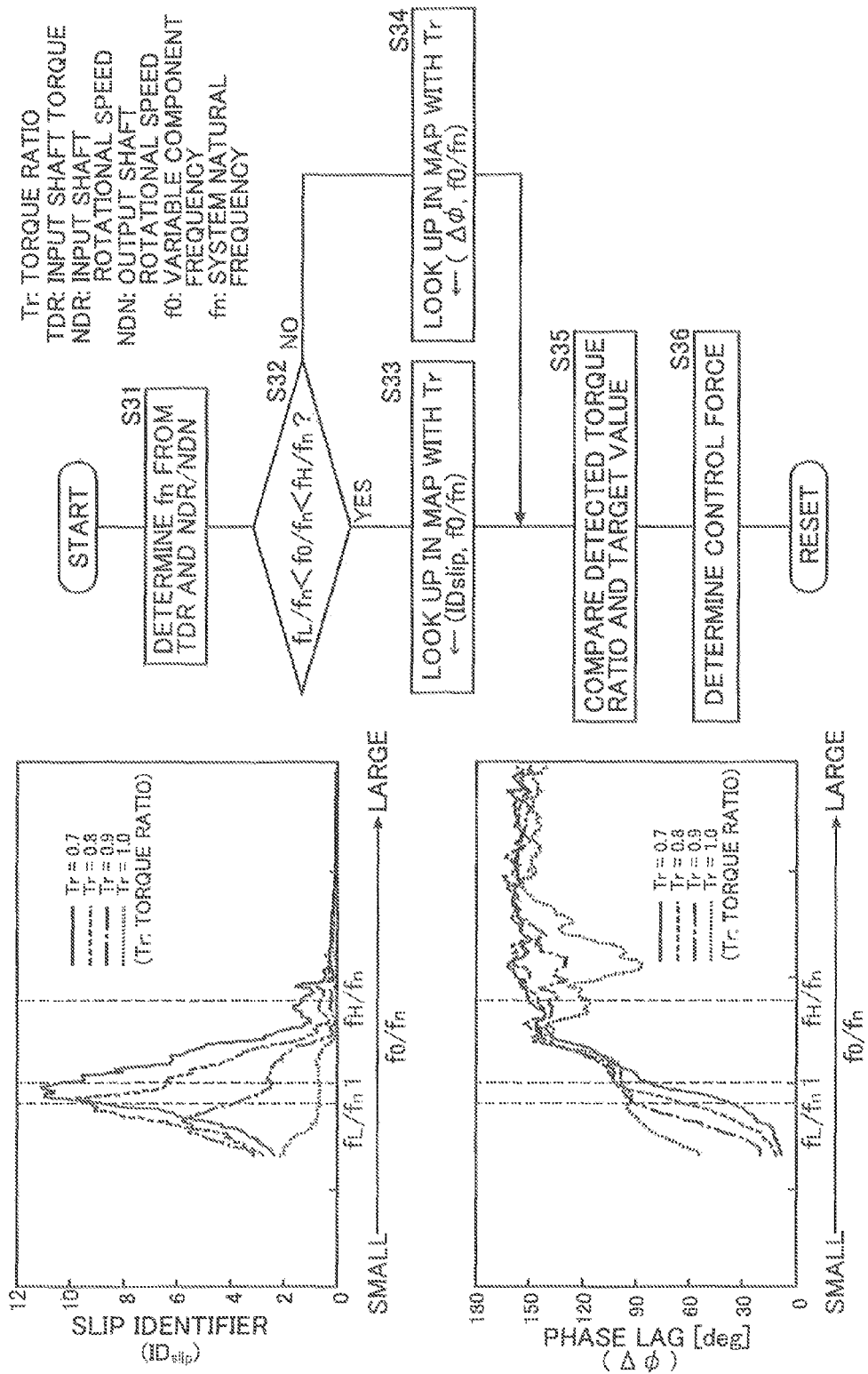
FIG. 14 is a diagram for explaining a method for estimating torque ratio. (third embodiment)

In FIG. 14, characteristic lines of a map via which a torque ratio Tr is looked up based on a frequency $f_0$ of a variable component and a slip identifier IDslip move in parallel to the direction of the abscissa when a natural frequency $f_n$ of a system changes. Since the natural frequency $f_n$ changes in response to the input shaft torque and the gear ratio of a belt type continuously variable transmission TM, it is necessary to prepare a plurality of maps for estimating the torque ratio Tr according to each natural frequency $f_n$, and there is the problem that this causes an increase in storage capacity of a memory or an increase in the cost. The reason why the natural frequency $f_n$ of the system changes is shown in FIG. 15.

Figure 15:
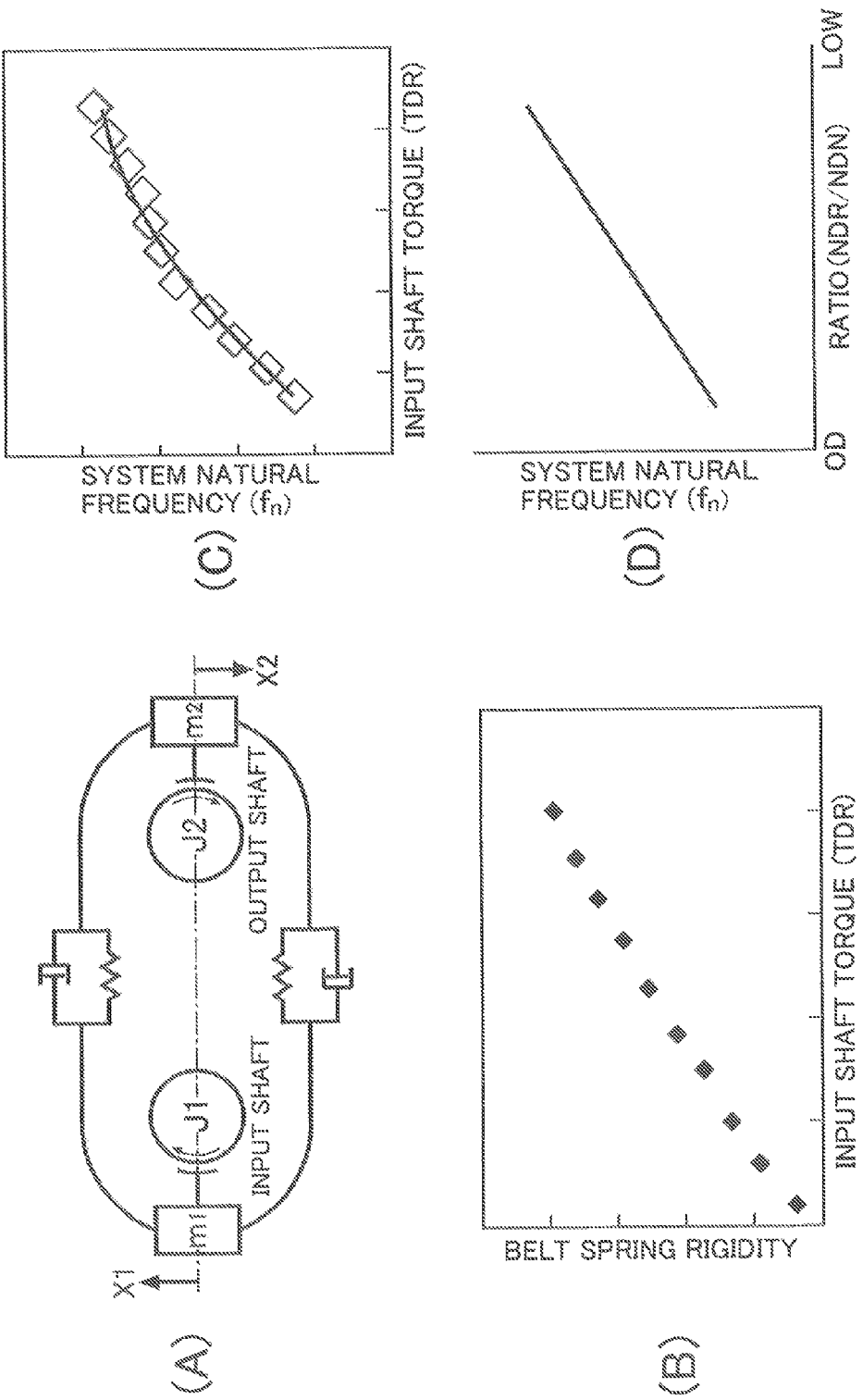
FIG. 15 is a diagram for explaining the reason why the natural frequency of the system changes. (third embodiment)

FIG. 15 (A) is a model of the belt type continuously variable transmission TM as a vibration system; masses m1 and m2 are in contact with an input shaft 11 and an output shaft 12, and the masses m1 and m2 are connected by an endless belt 15, which is formed from a spring and a dashpot. The endless belt 15 of the belt type continuously variable transmission TM is formed by supporting a large number of metal elements on a metal belt assembly formed by layering a plurality of metal belts, and transmits a driving force by pressing the metal elements against each other. Due to the contact surfaces between the metal elements deforming by compression to increase the contact area in response to increase in the input shaft torque, it gradually becomes difficult to deform the metal elements by compression, the spring rigidity of the spring of the model increases (see FIG. 15 (B)), and as a result the natural frequency $f_n$ of the system increases in response to an increase in the input shaft torque (see FIG. 15 (C)).

Furthermore, when the gear ratio of the belt type continuously variable transmission TM changes toward LOW, since the rotational speed of the output shaft 12 decreases relative to the rotational speed of the input shaft 11, the same effect as that of the moment of inertia J2 of the output shaft 12 itself decreasing is obtained, whereas when the gear ratio of the belt type continuously variable transmission TM changes to OD, since the rotational speed of the output shaft 12 increases relative to the rotational speed of the input shaft 11, the same effect as that of the moment of inertia J2 of the output shaft 12 itself increasing is obtained, and the natural frequency $f_n$ of the system thereby increases when the gear ratio changes toward LOW (see FIG. 15 (D)).

In step S31 of the flowchart of 14, the natural frequency $f_n$ is calculated from an input shaft torque TDR and a gear ratio. Since the input shaft torque TDR coincides with the output torque of the engine E, a value obtained by calculation in an ECU of the engine E may be used, and the gear ratio can be calculated in an electronic control unit U as the ratio NDR/NDN of an input shaft rotational speed NDR detected by an input shaft rotational speed sensor Sa and an output shall rotational speed NDN detected by an output shaft rotational speed sensor Sb.

Subsequently in step S32 upper and lower threshold values $f_L$ and $f_H$ and the frequency $f_0$ of a variable component are indicated by dividing by the natural frequency $f_n$. This enables a common map using an indicated frequency as a parameter to be used without preparing maps used when looking up the torque ratio Tr for each frequency region, and it is possible to reduce the memory storage capacity and reduce the cost. In the same manner as for the second embodiment, if $f_L/f_n < f_0/f_n < f_H/f_n$, then in step S33 the torque ratio Tr is looked up in a map employing the frequency $f_0/f_n$ of the variable component and the slip identifier IDslip as parameters, and if step S32 above $f_0/f_n \leq f_L/f_n$ or $f_0/f_n \geq f_H/f_n$, then in step S34 the torque ratio Tr is locked up in a map employing the frequency $f_0/f_n$ of the variable component and the phase lag $\Delta\phi$ as parameters. In step S35 the torque ratio Tr is compared with a target torque ratio STr, and in step S36 pulley lateral pressure is controlled, thereby enabling control to be carried out with higher precision.

Modes for carrying out the present invention are explained above, but the present invention may be modified in a variety of ways as long as the modifications do not depart from the spirit and scope thereof.

For example, the variable component of the input shaft element and the output shaft element of the present invention is not limited to rotational speed, and may be torque.

Furthermore, the input shaft element of the present invention is not limited to the input shaft 11 of the embodiment and may be a crankshaft of the engine E connected to the input shaft 11.

Moreover, in the embodiment the frequency $f_0$ of the variable component is calculated from the engine rotational speed detected by the engine rotational speed sensor Sc, but the frequency $f_0$ of the variable component may be calculated from an input shaft rotational speed detected by the input shaft rotational speed sensor Sa or an ignition timing signal of the engine E.

The invention claimed is:

1. A lateral pressure control apparatus for a continuously variable transmission, comprising:
an input shaft element to which the driving force of a drive source is inputted,
an output shaft element via which the driving force of the drive source is changed in speed and outputted,
a transmission element that is in contact with each of the input and output shaft elements and transmits the driving force from the input shaft element to the output shaft element by virtue of friction in contacted portions, and
torque ratio estimating device that estimates a torque ratio, which is the ratio of an actually transmitted torque relative to a maximum transmittable torque, based on transmission characteristics of a given variable component of the input shaft element to the output shaft element,
wherein the torque ratio estimating device estimates the torque ratio from either one of a slip identifier, which is an indicator for difference in amplitude of the variable component between the input and output shaft elements, and a phase lag, which is an indicator for difference in phase of the variable component between the input and output shaft elements and from a frequency of the variable component between the input and output shaft elements or a rotational speed of an engine as said drive source,
the continuously variable transmission comprises a drive pulley provided on the input shaft element, a driven pulley provided on the output shaft element, the transmission element, which is an endless belt wound around the two pulleys, and shift control device that controls a gear ratio of the continuously variable transmission, and
the shift control device controls a pulley lateral pressure that is applied to the drive pulley and the driven pulley based on a deviation between the estimated torque ratio and a target torque ratio so that the deviation becomes zero.

2. The lateral pressure control apparatus according to claim 1, wherein the torque ratio estimating device estimates the torque ratio by selecting the slip identifier or the phase lag according to a frequency band of the variable component.

3. The lateral pressure control apparatus according to claim 1 or claim 2, wherein the shift control device changes the target torque ratio to a reduced side when a speed of operation of an accelerator pedal increases outside a predetermined range.

4. The lateral pressure control apparatus for according to claim 1 or claim 2, wherein the shift control device changes the target torque ratio when an amount of variation in the torque ratio is outside a predetermined range.

5. The lateral pressure control apparatus according to claim 2, wherein the torque ratio estimating device estimates the torque ratio by correcting a change in the transmission characteristics due to change of a natural frequency of at least one of the input shaft element, the transmission element, and the output shaft element.

6. The lateral pressure control apparatus according to claim 5, wherein the slip identifier and the phase lag are a function of the frequency of the variable component, and the torque ratio estimating device corrects the frequency of the variable component using the natural frequency.

7. The lateral pressure control apparatus according to claim 5 or claim 6, wherein the shift control device changes the target torque ratio to a reduced side when a speed of operation of an accelerator pedal increases outside a predetermined range.

8. The lateral pressure control apparatus according to claim 5 or claim 6, wherein the shift control device changes the target torque ratio when an amount of variation in the torque ratio is outside a predetermined range.

9. The lateral pressure control apparatus according to claim 3, wherein the shift control device changes the target torque ratio, that has been changed to the reduced side, to an increased side when the speed of operation of the accelerator pedal has returned to a state staying in the predetermined range and said state has continued for a predetermined time.

10. The lateral pressure control apparatus according to claim 7, wherein the shift control device changes the target torque ratio, that has been changed to the reduced side, to an increased side when the speed of operation of the accelerator pedal has returned to a state staying in the predetermined range and said state has continued for a predetermined time.

* * * * *